United States Patent [19]

Sawdon

[11] Patent Number: 4,757,609

[45] Date of Patent: Jul. 19, 1988

[54] APPARATUS FOR JOINING SHEET MATERIAL

[75] Inventor: Edwin G. Sawdon, St. Clair, Mich.

[73] Assignee: BTM Corporation, Marysville, Mich.

[21] Appl. No.: 853,130

[22] Filed: Apr. 17, 1986

Related U.S. Application Data

[60] Continuation-in-part of Ser. No. 607,948, May 7, 1984, abandoned, which is a division of Ser. No. 495,440, May 17, 1983, Pat. No. 4,459,735, which is a continuation of Ser. No. 184,951, Sep. 8, 1980, abandoned.

[51] Int. Cl.$^4$ ............................................. B23P 19/00
[52] U.S. Cl. .......................................... 29/798; 29/432; 29/509; 29/243.52; 29/524.1; 72/465
[58] Field of Search ............ 29/798, 509, 432, 522 A, 29/21.1, 243.5, 243.52; 72/465, 466, 470, 471, 478

[56] References Cited

U.S. PATENT DOCUMENTS

| | | |
|---|---|---|
| Re. 31,535 | 3/1984 | Schleicher .................... 29/432.2 |
| 567,606 | 9/1896 | McCool et al. ................. 72/478 X |
| 679,137 | 7/1901 | Baxter .......................... 411/97 |
| 1,283,799 | 11/1918 | Kerr ............................ 72/465 |
| 1,456,079 | 5/1923 | Stuebner . |
| 1,919,999 | 7/1933 | Borton . |
| 1,926,686 | 9/1933 | Newton . |
| 1,969,214 | 8/1934 | Dit Daude . |
| 1,985,333 | 12/1934 | Wiley . |
| 2,004,182 | 6/1935 | Arey . |
| 2,254,558 | 9/1941 | Williams .................... 29/432 X |
| 2,278,293 | 3/1942 | Watson ...................... 72/478 X |
| 2,333,966 | 11/1943 | Weiss . |
| 2,404,197 | 7/1946 | Sirp . |
| 2,430,377 | 11/1947 | Vorreyer . |
| 2,467,969 | 4/1949 | Debrot, Jr. . |
| 2,619,855 | 12/1952 | Williams ......................... 29/432 |
| 2,626,687 | 1/1953 | Williams .................... 29/432 UX |
| 2,632,929 | 3/1953 | Poupitch . |
| 2,663,072 | 12/1953 | Pfistershammer . |
| 2,671,361 | 3/1954 | Sandberg ................... 29/432 UX |
| 2,688,890 | 9/1954 | Williams . |
| 2,713,197 | 7/1955 | Schmidt . |
| 2,811,880 | 11/1957 | Williams ................... 29/21.1 UX |
| 2,865,451 | 12/1958 | Ihrig . |
| 2,924,312 | 2/1960 | Williams .................... 29/432 UX |
| 2,937,681 | 5/1960 | Patten . |
| 3,157,942 | 11/1964 | MacLean, Jr. . |
| 3,177,914 | 4/1965 | MacLean, III et al. . |
| 3,178,749 | 4/1965 | Heepe . |
| 3,187,796 | 6/1965 | Double . |
| 3,198,155 | 8/1965 | Fraze ............................ 29/509 X |
| 3,315,345 | 4/1967 | Double et al. ................. 29/432.1 |
| 3,338,463 | 8/1967 | Henrickson . |
| 3,357,388 | 12/1967 | Dunn . |
| 3,359,935 | 12/1967 | Rosbottom ................... 29/509 X |
| 3,404,648 | 10/1968 | Rosbottom . |
| 3,439,723 | 4/1969 | Double et al. . |
| 3,451,367 | 6/1969 | Henrickson ................... 29/509 X |
| 3,469,613 | 9/1969 | Steward . |
| 3,470,596 | 10/1969 | Belada . |
| 3,506,050 | 4/1970 | Pouch et al. . |
| 3,579,809 | 5/1971 | Wolf .............................. 29/509 |

(List continued on next page.)

FOREIGN PATENT DOCUMENTS

| | | |
|---|---|---|
| 98517 | 10/1897 | Fed. Rep. of Germany . |
| 1452650 | 2/1973 | Fed. Rep. of Germany . |
| 415589 | 3/1941 | Japan . |
| 14680 | 8/1967 | Japan . |
| 42707 | 12/1973 | Japan . |
| 113753 | 9/1979 | Japan . |

(List continued on next page.)

Primary Examiner—Charlie T. Moon
Attorney, Agent, or Firm—Harness, Dickey & Pierce

[57] ABSTRACT

There is disclosed an improved apparatus for joining a plurality of pieces of sheet metal or other sheet material items by first drawing and then laterally extruding portions of the material to be joined into an enlarged shape which will permanently mechanically interlock the sheet material pieces. The apparatus utilizes a novel die construction in which portions thereof are resiliently biased toward one another and pivot or slide laterally in response to lateral extrusion of the joining material, and which is applicable to conventional "lanced" type joints as well as to a novel leakproof joint. A method of forming a leakproof joint between a plurality of pieces of sheet material and a method of fabricating a novel die construction are also disclosed.

30 Claims, 8 Drawing Sheets

U.S. PATENT DOCUMENTS

| | | | |
|---|---|---|---|
| 3,599,318 | 8/1971 | Behlen | 29/509 |
| 3,615,274 | 10/1971 | Belada | 29/432 X |
| 3,726,000 | 4/1973 | Hafner | 29/432 X |
| 3,771,216 | 11/1973 | Johnson | 29/509 |
| 3,791,016 | 2/1974 | Eberhardt et al. | 29/432 |
| 3,810,290 | 5/1974 | Grube . | |
| 3,829,957 | 8/1974 | Pouch et al. | 29/509 X |
| 3,862,485 | 1/1975 | Hafner . | |
| 3,877,133 | 4/1975 | Grube | 29/509 X |
| 3,885,299 | 5/1975 | Hafner | 29/432.2 X |
| 3,900,937 | 8/1975 | Schleicher | 29/432 X |
| 3,919,955 | 11/1975 | DuVernay | 29/509 X |
| 3,920,059 | 11/1975 | Grube . | |
| 3,921,276 | 11/1975 | Oaks | 29/432 X |
| 3,924,378 | 12/1975 | Hafner | 29/521 X |
| 3,934,327 | 1/1976 | Hafner | 29/432 |
| 3,969,808 | 7/1976 | Goodsmith et al. . | |
| 3,981,064 | 9/1976 | Hafner | 29/432 |
| 3,999,659 | 12/1976 | Grube . | |
| 4,035,901 | 7/1977 | Lux et al. | 29/432.1 X |
| 4,059,897 | 11/1977 | Marquis | 29/432.1 X |
| 4,064,617 | 12/1977 | Oaks | 29/432.1 X |
| 4,153,989 | 5/1979 | Shinjo | 29/798 X |
| 4,203,187 | 5/1980 | Grube | 29/283.5 |
| 4,208,776 | 6/1980 | Schleicher | 29/243.5 |
| 4,237,567 | 12/1980 | Grube | 29/432 X |
| 4,242,793 | 1/1981 | Matthews et al. | 29/798 |
| 4,306,511 | 12/1981 | Ashby et al. | 29/522 R X |
| 4,384,667 | 5/1983 | Smallegan et al. | 29/798 X |
| 4,394,794 | 7/1983 | Shirey | 29/432 |
| 4,525,912 | 7/1985 | Kazino et al. | 29/432.1 X |

FOREIGN PATENT DOCUMENTS

| | | |
|---|---|---|
| 664979 | 1/1952 | United Kingdom . |
| 708236 | 4/1954 | United Kingdom . |
| 713625 | 8/1954 | United Kingdom . |
| 895561 | 5/1962 | United Kingdom . |
| 930164 | 7/1963 | United Kingdom . |
| 934101 | 8/1963 | United Kingdom . |
| 945110 | 12/1963 | United Kingdom . |
| 1008914 | 11/1965 | United Kingdom . |
| 1041119 | 9/1966 | United Kingdom . |
| 1101795 | 1/1968 | United Kingdom . |
| 1114826 | 5/1968 | United Kingdom . |
| 1202275 | 8/1970 | United Kingdom . |
| 1378534 | 12/1974 | United Kingdom . |
| 1551353 | 8/1979 | United Kingdom . |
| 2055648 | 3/1981 | United Kingdom . |
| 2069394 | 8/1981 | United Kingdom . |
| 2071000 | 12/1983 | United Kingdom . |

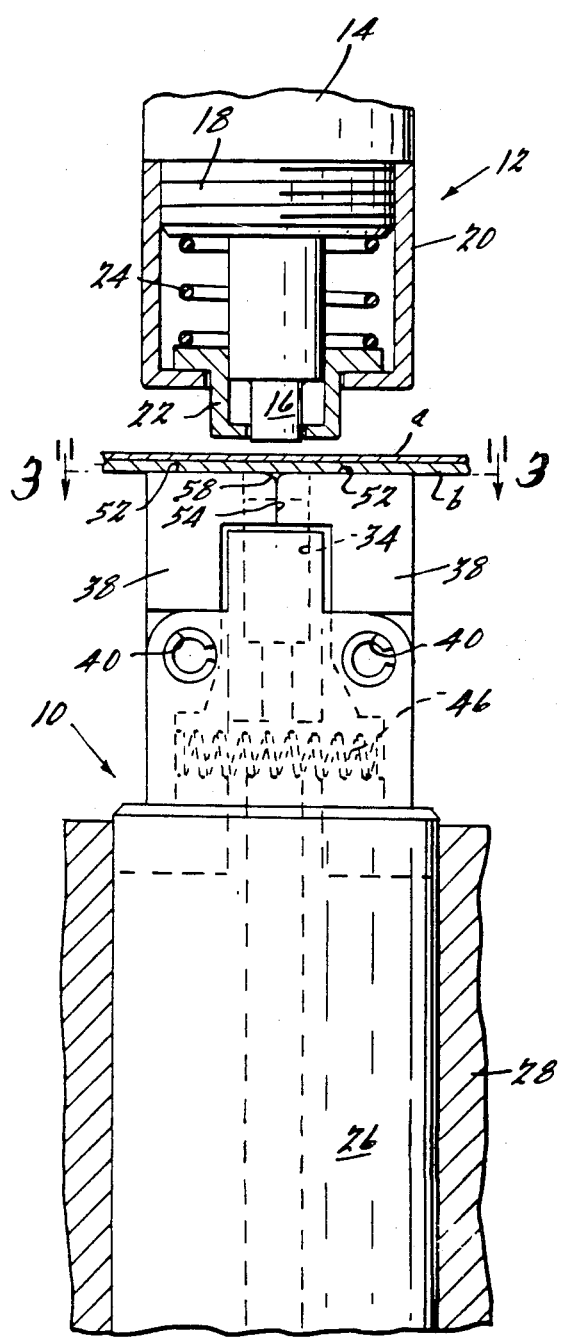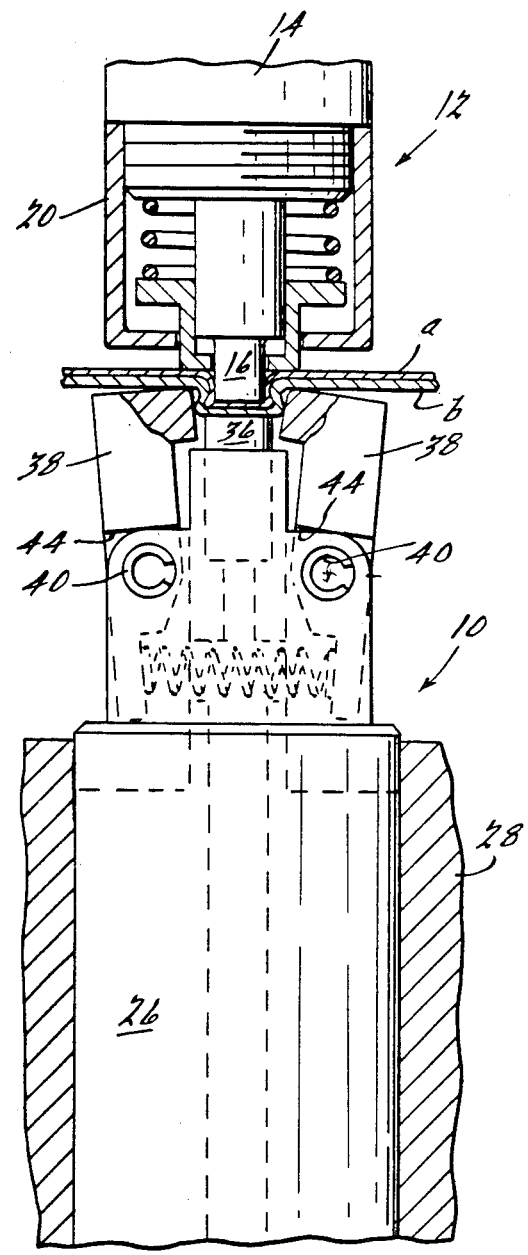

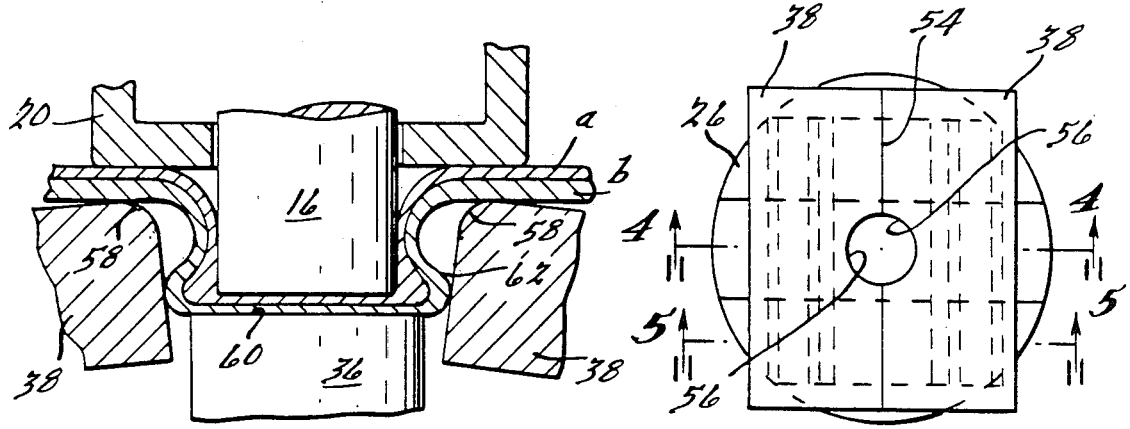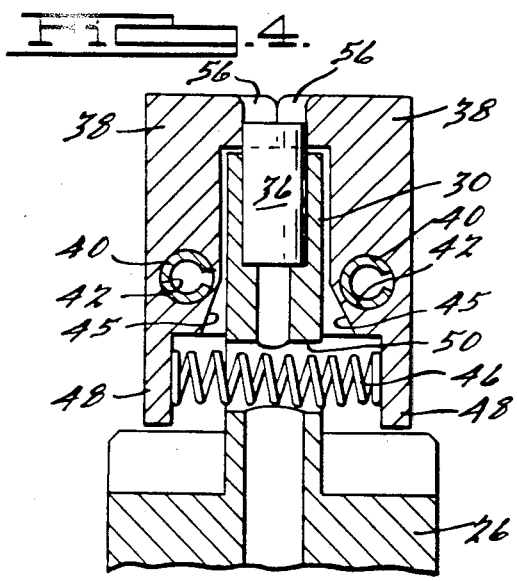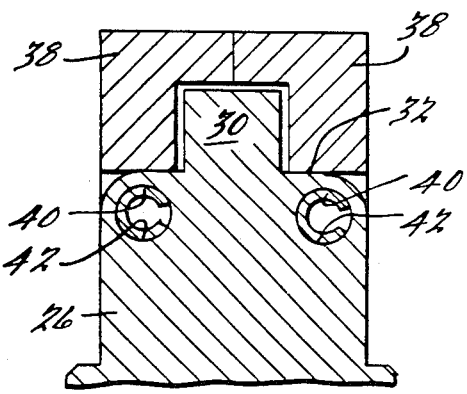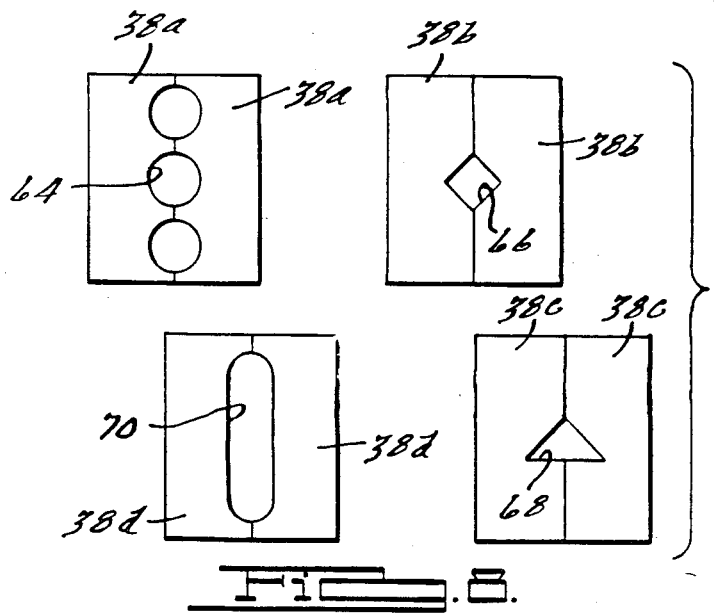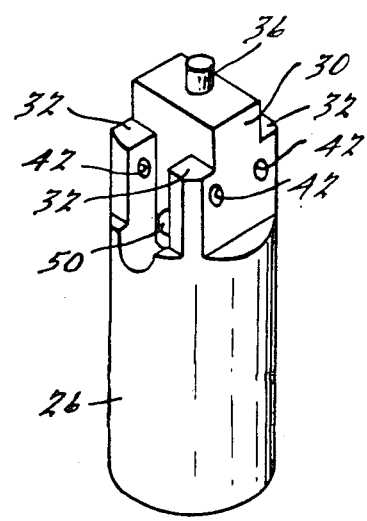

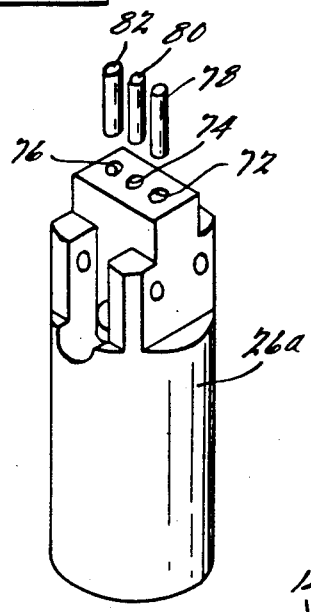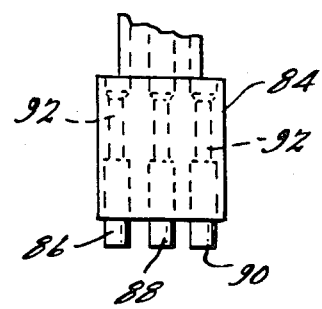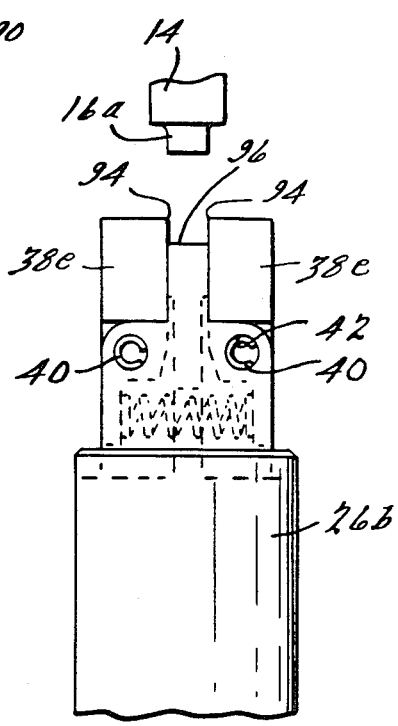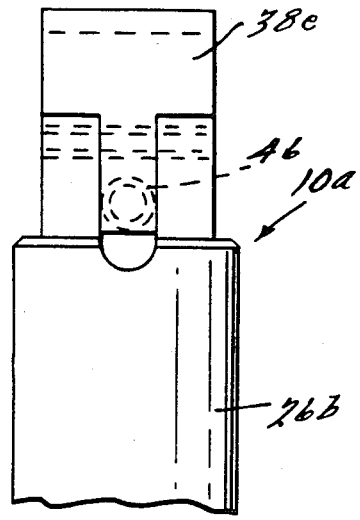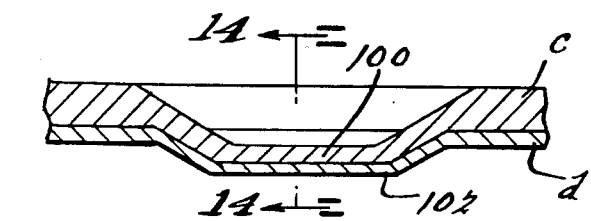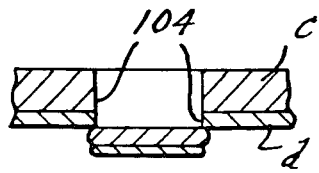

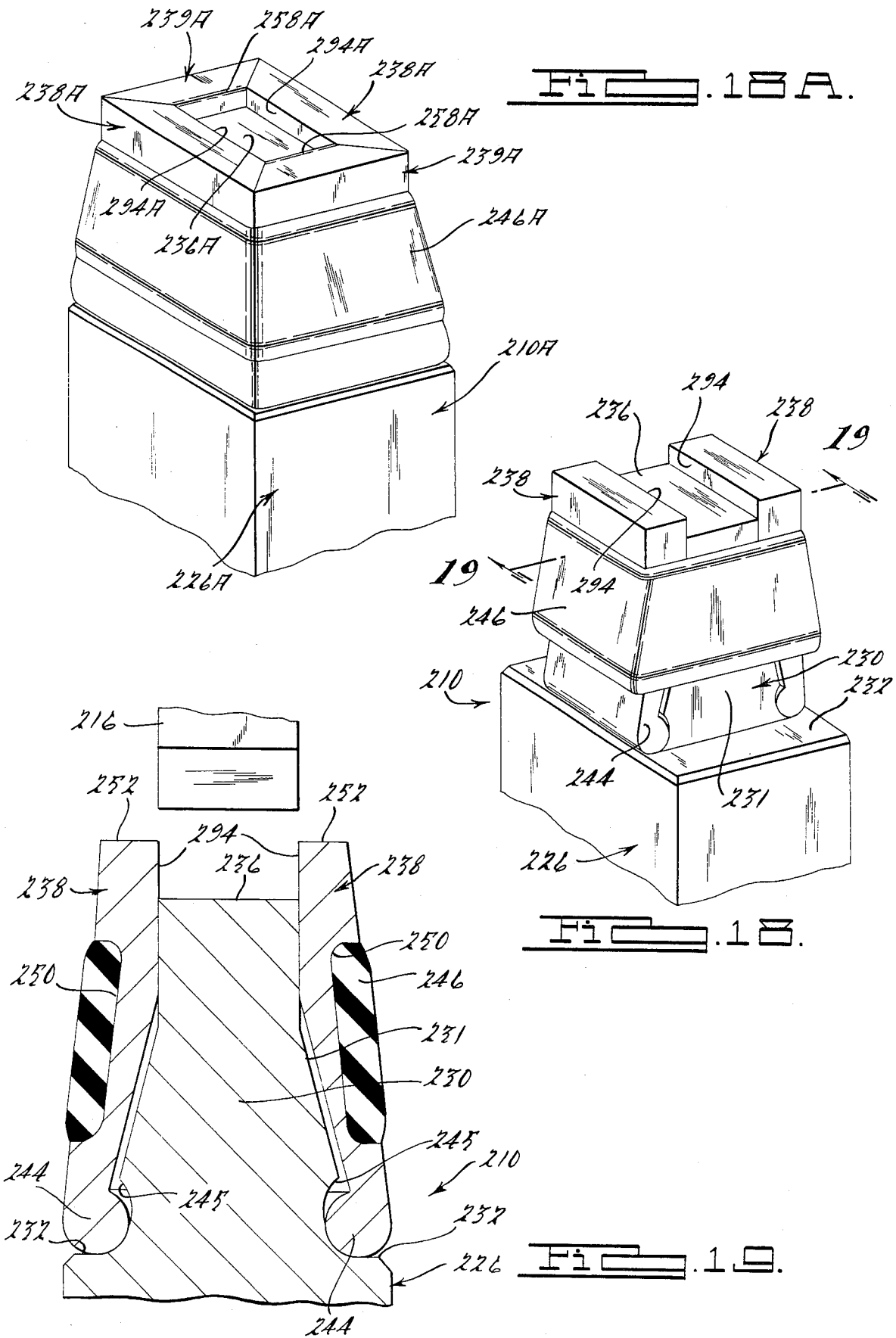

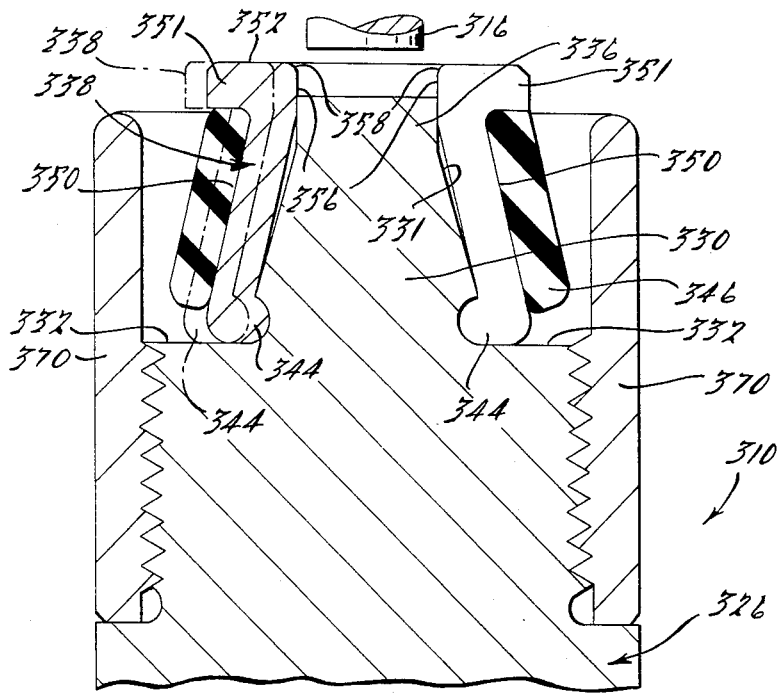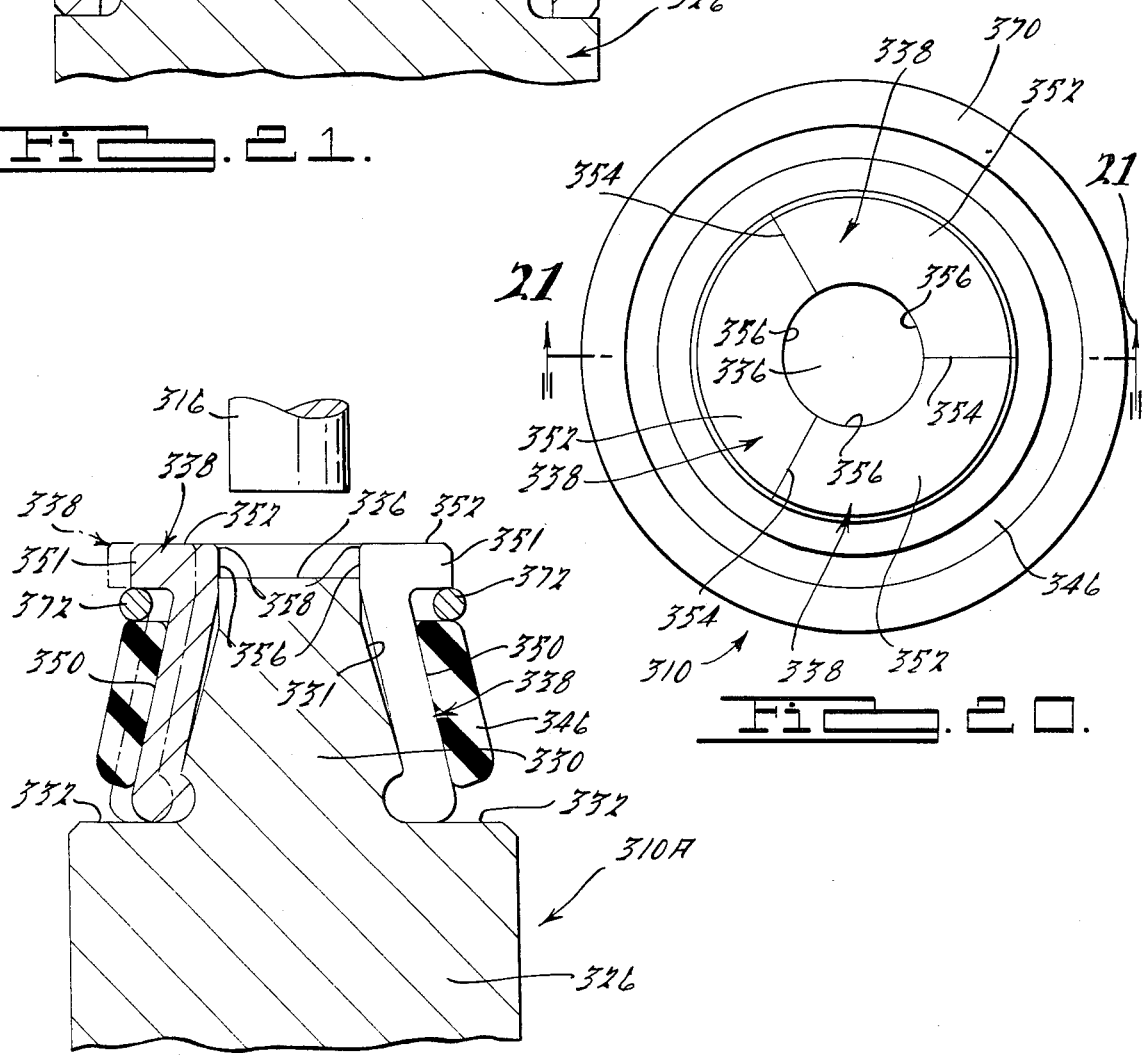

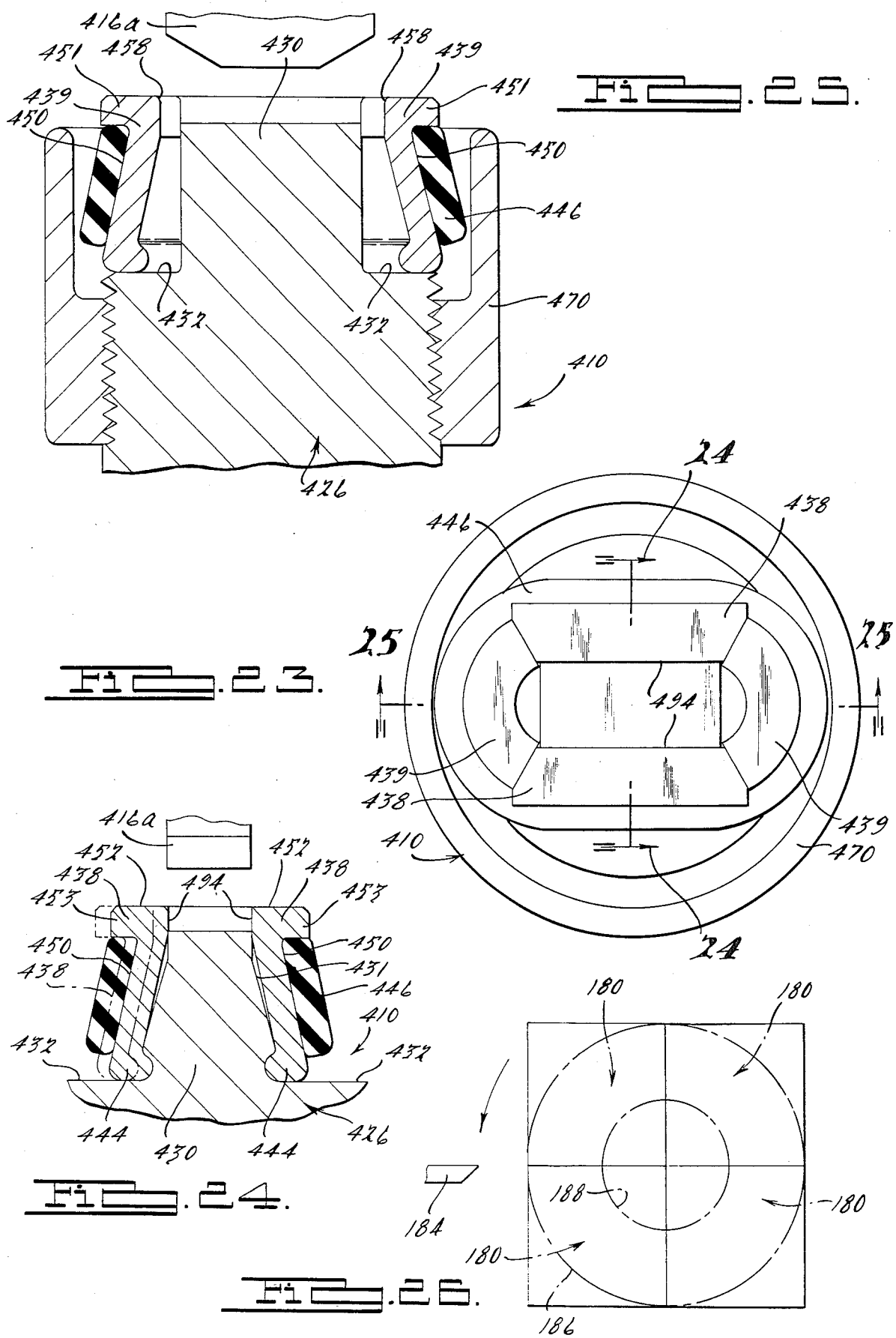

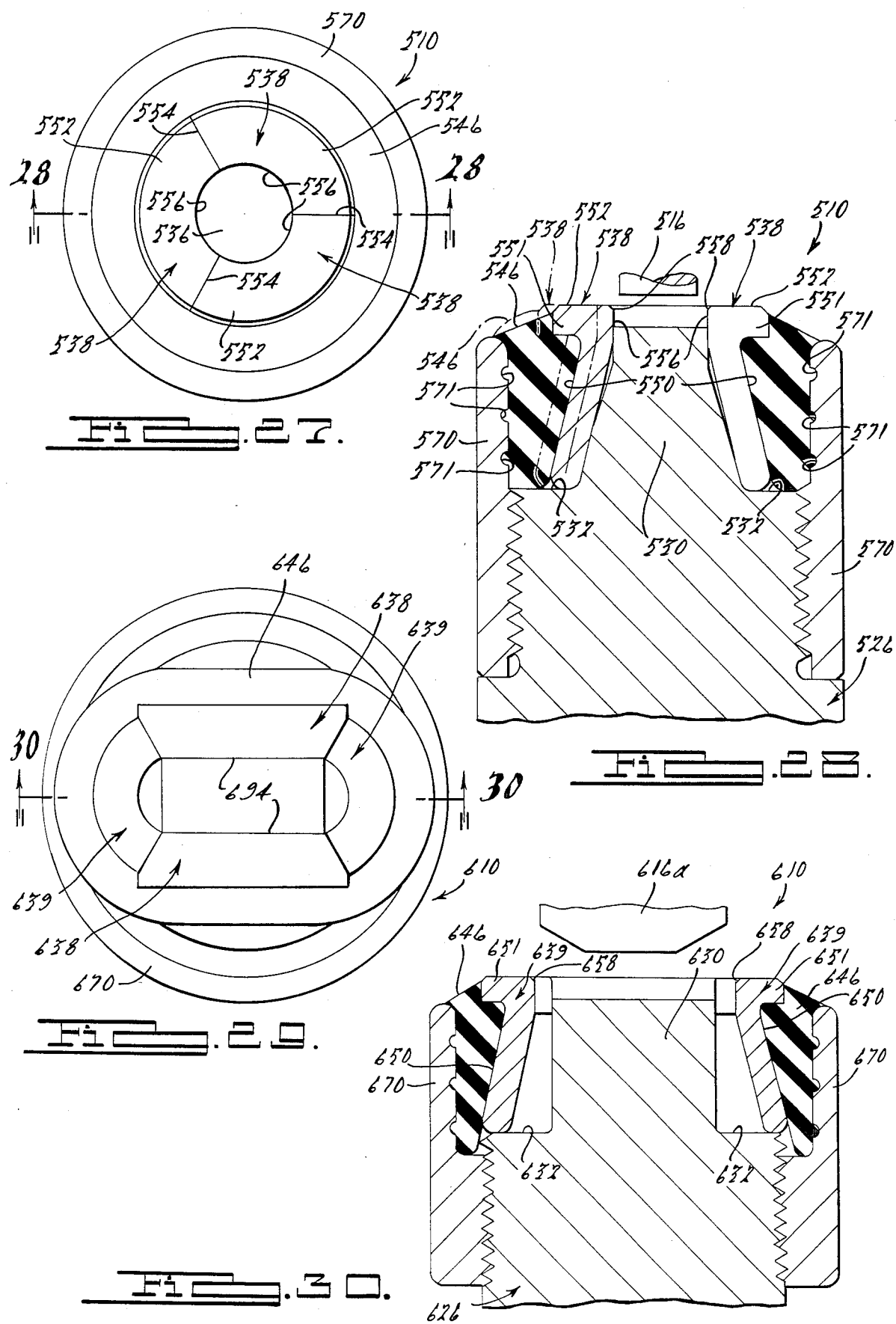

APPARATUS FOR JOINING SHEET MATERIAL

This is a continuation-in-part of a copending U.S. patent application, Ser. No. 607,948, filed May 7, 1984 (now abandoned), which was a division of U.S. patent application, Ser. No. 495,440, filed May 17, 1983 (now issued as U.S. Pat. No. 4,459,735), which in turn was a continuation of U.S. patent application, Ser. No. 184,951, filed Sept. 8, 1980 (now abandoned).

BACKGROUND AND SUMMARY OF THE INVENTION

The present invention relates generally to joining sheet metal or other sheet materials and more particularly to an apparatus for forming such joints and a method of forming such joints, as well as leakproof and non-leakproof joints formed thereby.

It is old in the art to join a plurality of pieces of sheet metal by punching or otherwise manipulating them to cause them to be deformed into an interlocking relationship in a localized area. However, insofar as Applicant is aware, such joints typically require the shearing of the sheet material and hence are not suitable for leakproof applications unless a sealant is applied. The formation of such joints is also frequently destructive of the corrosion resistance of coated materials. In addition, the known apparatuses for forming the joints are frequently relatively complex in design, often requiring powered actuation of both a punch and one or more portions of the die, and frequently require expensive sliding die portions. This complexity increases the cost of the equipment, as well as the energy required for operation.

It is therefore a primary object of the present invention to provide an improved method and apparatus for permanently joining sheet metal or other sheet material items, with the capability of forming either leakproof joints or conventional "lanced" joints. Additional objects reside in the provision of such a forming apparatus that is relatively simple but durable in construction, that can utilize standard or specialized punches, that requires very little power, that is compact and hence usable in many different applications, that substantially preserves the corrosion resistance of coated sheet materials being joined, and that is suited for use either as part of a small press or in C-frame holders in larger presses.

Another object of the present invention resides in the provision of an improved die assembly for use in sheet material joining apparatuses, and which is readily adapted to many different joint configurations, including conventional "lanced" joints as well as a novel leakproof joint.

Further objects of the present invention reside in the provision of a novel leakproof joint for sheet material as well as in the provision of a novel method for forming such a joint.

These and other objects, features and advantages of the present invention will become apparent from the subsequent description and the appended claims, taken in conjunction with the accompanying drawings.

BRIEF DESCRIPTION OF THE DRAWINGS

FIG. 1 is a partial front elevational view of an apparatus incorporating the principles of the present invention, shown in its retracted position.

FIG. 2 is a view similar to FIG. 1, but showing the apparatus in its advanced position.

FIG. 3 is a view taken generally along line 3—3 in FIG. 1.

FIG. 4 is a partial sectional view taken generally along line 4—4 in FIG. 3.

FIG. 5 is a partial sectional view taken generally along line 5—5 in FIG. 3.

FIG. 6 is a perspective view of the die body of the apparatus shown in FIGS. 1 through 5.

FIG. 7 is an enlarged partial sectional view illustrating the leakproof joint of the present invention at the point of completion of its formation.

FIG. 8 illustrates dies for forming a plurality of different shaped joints according to the present invention.

FIG. 9 is a partially exploded perspective view of an exemplary alternative form of the die body for the apparatus shown in FIGS. 1 through 8.

FIG. 10 is a partial elevational view of a universal punch assembly suited for use with the die assembly of FIG. 9.

FIG. 11 is a partial front elevational view of another embodiment of an apparatus incorporating the principles of the present invention, and which is applicable to the formation of conventional "lanced" type joints.

FIG. 12 is a side elevational view of the apparatus of FIG. 11.

FIG. 13 is an enlarged partial sectional view of a "lanced" joint formed by the apparatus of FIGS. 11 and 12.

FIG. 14 is a partial sectional view taken generally along line 14—14 in FIG. 13.

FIG. 18 is a partial perspective view of still another embodiment of an apparatus incorporating the principles of the present invention, and which is applicable to the formation of conventional "lanced" type joints.

FIG. 18A is a partial perspective view illustrating a variation on the embodiment of FIG. 18, in which non-shearing die segments are added at the ends of the apparatus.

FIG. 19 is a partial sectional view of the apparatus of FIG. 18, taken generally along line 19—19 of FIG. 18, with the corresponding partial sectional view of the apparatus of FIG. 18A being generally similar except for the addition of the non-shearing end die segment.

FIG. 20 is a top view of a further embodiment of an apparatus incorporating the principles of the present invention, and which is adapted for the formation of a leakproof joint according to the present invention.

FIG. 21 is a partial sectional view taken generally along line 21—21 of FIG. 20.

FIG. 22 is a partial sectional view similar to that of FIG. 21, but illustrating a variation on the embodiment shown in FIGS. 20 and 21.

FIG. 23 is a top view of a still further embodiment of an apparatus incorporating the principles of the present invention, and which is adapted for formation of conventional "lanced" type joints.

FIG. 24 is a partial sectional view taken generally along line 24—24 of FIG. 23.

FIG. 25 is a partial sectional view taken generally along line 25—25 of FIG. 23.

FIG. 26 is an end view of four pieces of bar stock, diagrammatically illustrating a method, according to the present invention, by which a plurality of die segments for a joint-forming apparatus can be fabricated substantially simultaneously.

FIG. 27 is a top view similar to that of FIG. 20, but illustrating still another embodiment of the present invention.

FIG. 28 is a partial sectional view taken generally along line 28—28 of FIG. 27.

FIG. 29 is a top view similar to that of FIG. 23, but illustrating still another embodiment of the present invention.

FIG. 30 is a partial sectional view taken generally along line 30—30 of FIG. 29.

DETAILED DESCRIPTION OF THE PREFERRED EMBODIMENTS

Figure 15:
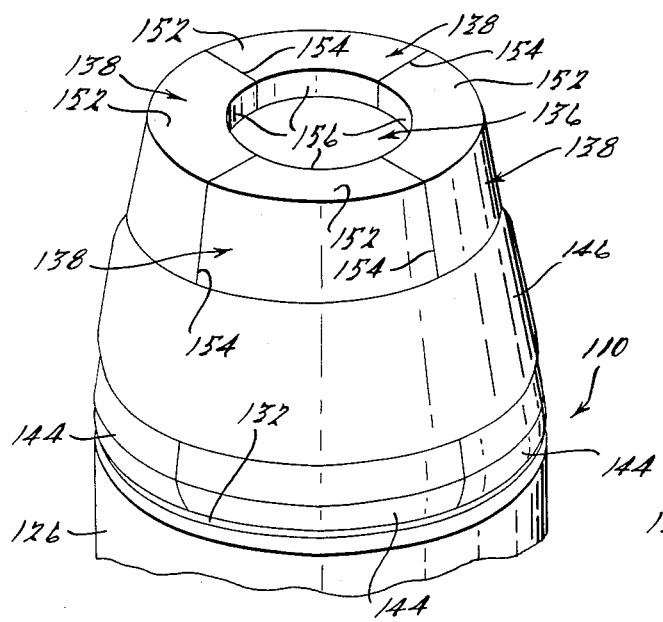
FIG. 15 is a partial perspective view of another embodiment of an apparatus incorporating the principles of the present invention, and which is applicable to the formation of a leakproof joint according to the present invention.

FIGS. 1 through 26 illustrate various exemplary embodiments of the present invention for purposes of illustration. One skilled in the art will readily recognize from the following discussion, taken together with the drawings, that the principles of the present invention are equally applicable to embodiments of the invention other than those shown in the drawings. One skilled in the art will also readily recognize that the principles of the present invention are applicable to both sheet metal as well as various other formable sheet materials.

With reference to FIGS. 1 through 6, there is shown a sheet metal joining apparatus generally comprising a die assembly 10 and a punch assembly 12 for joining two pieces of sheet metal or other formable sheet material indicated at a and b, respectively. Although only two pieces of sheet material are shown, it is to be understood that more than two pieces may be joined in accordance with the principles of the present invention, depending upon the composition and thicknesses of sheet material in question. It is envisioned that the most common materials to be joined by the present invention will include sheet stock materials, such as aluminum, galvanized, brass, steel, etc., both coated and uncoated. The invention is particularly useful and advantageous in joining sheet material items composed of different materials where such dissimilar materials cannot be welded to one another.

Punch assembly 12 is of conventional construction, including a punch body 14 mounting a circular punch 16 and having a threaded portion 18 for threadably supporting a stripper retainer 20. Disposed within retainer 20 is a stripper 22 biased to the stripping position illustrated in FIG. 1 by means of coil springs 24. Punch 16 preferably has a smooth flat tip, with a small radius at the edge as shown in FIG. 7.

Die assembly 10 comprises cylindrical die body 26 mounted in the usual manner within a support structure 28 which may either be the lower leg of a conventional "C-frame" clamping device for use in a standard press, or the lower die supporting portion of a small press, such as a press of the type disclosed in Applicant's U.S. Pat. No. 3,730,044. Die body 26 is provided at its upper end (as shown) with an integral boss 30, illustrated primarily in FIGS. 5 and 6, from the opposite sides of which extend four shoulders 32. Die body 26 is centrally bored and at the upper end thereof is provided a bore portion 34 in which is disposed (as by press fit) a hardened pin 36 which acts as an anvil or lower die member.

Pivotally supported on each side of die body 26, by means of roll pins 40 or other pivot members located in apertures 42, is a die portion or die segment 38. Each die portion or segment 38 is generally T-shaped in side elevation and is provided with two shoulders 44 engageable with two shoulders 32 on die body 26, so that vertical forces exerted on the die portions are transmitted directly to the die body and are not absorbed by pivot pins 40. Die portions 38 are relieved at 45 to facilitate limited rotational or pivotal movement between the respective positions illustrated in FIGS. 1 and 2, and are maintained in a normally closed position, as shown in FIG. 1, by means of a coil spring 46. Spring 46 passes through a suitable aperture 50 extending through boss 30 and biasingly acts between downwardly-extending integral legs 48 on die portions 38.

When die portions 38 are in their closed position illustrated in FIG. 1, the upper surfaces 52 thereof lie in a common horizontal plane and the abutting faces of the die portions lie in a common vertical plane 54 (or planes 54 where more than two die portions are used). In this embodiment die portions 38 are each provided with a complementary semi-circular recess 56 centered on plane 54 and defining, when the die portions are in their closed position, an opening having a shape complementary to that of punch 16. Forces exerted downwardly on die portions 38 by punch 16 acting on the workpieces will not tend to pivot them away from one another because the pivotal axes defined by roll pins 40 are disposed laterally outwardly of the edges of the opening defined by recesses 56. Thus any downward force exerted on the die portions by the punch, such as when the punch initially enters the die opening, will tend to close, rather than open, the die assembly. In this embodiment the edge of the opening defined by recesses 56 should be chamfered or radiused, as indicated at 58 (FIGS. 1 and 7), to reduce the chance of fracturing or shearing the sheet material workpieces.

In operation, the apparatus is initially in the position illustrated in FIG. 1. Two or more sheet material items are first positioned in an overlapping or face-to-face relationship and then placed into the apparatus, as shown in FIG. 1, with the lower surface of the sheet material assembly disposed on surfaces 52 of die portions 38. Thereafter the press or other apparatus is actuated to cause the punch to move downwardly (as shown) towards material items a and b and die assembly 10.

Upon engagement of die punch 16 and the sheet material, portions 60 of the sheet material items a and b are deformed and drawn downwardly toward the upper surface of anvil 36. There is no fracturing or shearing of the material because of the provision of radius 58 around the periphery of the opening defined by recesses 56 and because of a preferably uniform clearance between die portions 38 and punch 16. The drawing action results directly from the coaction of the punch and the opening defined by recesses 56 in die portions 38. As punch 16 approaches anvil 36, within the die opening, and reaches a distance from anvil 36 that is less than the total combined original thickness of sheet material pieces a and b, there is a transverse or lateral extrusion of the sheet material portions 60 to form the laterally enlarged shape 62 in FIG. 7, which results in a mechanical interlock between sheet material pieces a and b. In this regard, it should be noted that FIG. 7 is not drawn to scale, but is intended to provide a representative illustration of the cross-sectional configuration of the material portions forming the joint.

The force of the lateral extrusion of sheet material portions 60 causes die portions 38 to pivot laterally outwardly, as best illustrated in FIGS. 2 and 7. A strong, permanent and leakproof joint having been formed, the punch is then withdrawn to the position illustrated in FIG. 1 and the workpiece removed. It is noteworthy that in Applicant's illustrated apparatus, only punch 16 requires actuation, and anvil 36 remains fixed. In certain applications, however, the punch can be stationary with the die assembly being actuable, or other arrangements providing for relative movement between the punch and die assembly can also be used. Upon removal of the workpiece, spring 46 causes die portions 38 to pivotally move back to their closed position illustrated in FIG. 1.

Shearing or lancing of the sheet material portions is avoided in the aforedescribed apparatus by providing radius 58 and an appropriate clearance between punch 16 and the opening defined by recessed 56. This clearance is preferably of uniform width. Although Applicant has not fully optimized the respective dimensions of the parts, the formulae below establish dimensions which have been found to provide very satisfactory results:

$$P = 2(M1 + M2) \ (\pm 20\%)$$

$$D = P + 0.8(M1 + M2)$$

$$T = 0.2(1.2(M1 + M2)$$

where:
P = punch diameter
D = die diameter
M1 = top sheet material thickness
M2 = bottom sheet material thickness
T = total sheet material thickness at center of joint
These relationships have been found to at least be a satisfactory starting point. Once the punch diameters are chosen, and the apparatus is assembled and tested, satisfactory results can be obtained for the materials being joined by adjusting the bottom anvil height using the standard "shut height" adjustment (not shown) provided on conventional small presses and C-frames, thereby adjusting the distance between the bottom of the punch and the anvil when the press is at the end of its downward stroke.

Although the apparatus of the exemplary embodiment of FIGS. 1 through 7 illustrates the use of a circular punch, other shapes may be used, depending upon the application and the strength required. For example, FIG. 8 illustrates four different exemplary configurations which might be used. Die portions 38a are provided with three circular apertures 64 for those applications in which either the desired anti-rotation characteristics or the desired strength characteristics require more than a single circular joint. Die portions 38b have a diamond-shaped aperture 66 which is capable of providing a joint of strength comparable to that of the first embodiment, but yielding better anti-rotational characteristics. Die portions 38c have a triangular opening 68 which should give results similar to those of the diamond-shaped opening 66. Die portions 38d have an exemplary oval-shaped opening 70 providing a relatively large joint of high strength and high anti-rotational characteristics. Regardless of cross-sectional shape, the interior wall of the drawn portion of the upper piece of sheet material will typically be generally cylindrical in configuration.

FIG. 9 illustrates a universal type die body 26a, which is virtually identical to die body 26 of the first embodiment but is provided with a plurality of parallel vertically aligned holes 72, 74 and 76 adapted to receive hardened anvil pins 78, 80 and 82, respectively, in a press fit relationship. In applications where a single circular joint is sufficient, pins 78 and 82 may be removed from die body 26a, thus reducing the energy requirements of the apparatus. On the other hand, if greater strength or anti-rotation characteristics are desired, then one or two more additional pins may be inserted in the proper hole to provide additional joining capability. The die portions which would be affixed to die body 26a would have a top configuration similar to that shown at 38a in FIG. 8, with openings 64 being designed to cooperate with pins 78, 80 and 82.

FIG. 10 illustrates the lower portion of a punch which can be used with the universal die body of FIG. 9. The punch body 84, can be conventional in all other respects and is provided with a plurality of press-fit hardened steel punch pins 86, 88 and 90 adapted to coact with anvils 78, 80 and 82, respectively, in the same manner that punch 16 coacts with anvil 36 in the embodiment of FIGS. 1 through 7. Suitable apertures 92 may be provided in the punch body 84 to permit removal of the punches for replacement or for reducing the number of punches for a particular application. The punch pins and anvils alternately can be non-circular in cross-section if desired in a particular application.

In FIGS. 11 and 12, a slightly modified version of the die assembly and punch is capable of forming conventional "lanced" type joints, such as that illustrated in FIGS. 13 and 14. The die assembly 10a of this embodiment includes die body 26b and is substantially the same as die assembly 10 of the first embodiment (the same or similar reference numerals are used to indicate identical or similar parts in the embodiments of FIGS. 1 through 10 and FIGS. 11 and 12), except that die portions 38e are not provided with recesses to define a punch-receiving opening, but instead are provided with cutting edges 94. In addition, the anvil includes an integrally formed continuous flat generally horizontal surface 96 extending virtually the full length of cutting edges 94. Punch 16a of this embodiment is generally spade-shaped, having a width substantially the same as the distance between cutting edges 94 and having chamfered corners 98.

In FIGS. 13 and 14 sheet metal pieces or items c and d are shown as joined by the apparatus of FIGS. 11 and 12. As punch 16a moves downwardly toward the die assembly, sheet material portions 100 and 102 are lanced out of sheet material pieces c and d, respectively. These sheet material projections or portions 100 and 102 remain integrally attached to the parent material at the ends thereof, as best shown in FIG. 13, but are totally severed from the parent sheet material pieces c and d along their sides 104, as shown in FIG. 14. Continued advancement of the punch toward the anvil causes a transverse or lateral extruding of sheet material portions 100 and 102 to create the enlarged section shown in FIG. 14, which provides the necessary mechanical interlock to give the joint its integrity. However, as will be appreciated, because the sheet material is lanced, a joint of this type is not leakproof. As the sheet material portions are extruded laterally, they cause die portions 38e to pivot apart to accommodate the lateral extrusion. Thus, the use of applicant's die assembly has been found to very satisfactorily permit the formation of this type of joint without the use of moving anvils and complex sliding dies.

Figure 16:
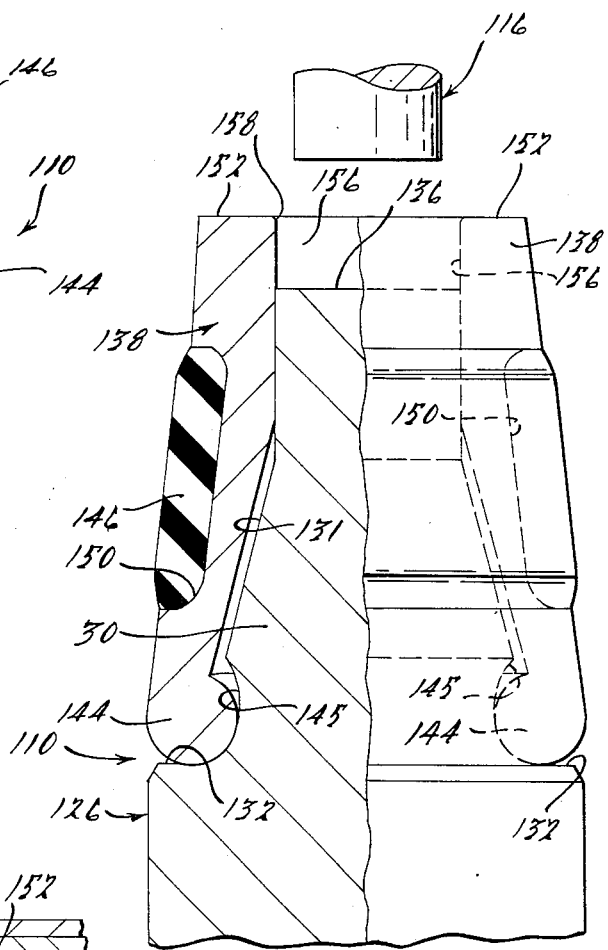
FIG. 16 is a partial elevational view of the apparatus of FIG. 15, with a portion of the apparatus shown in longitudinal cross-section.
Figure 17:
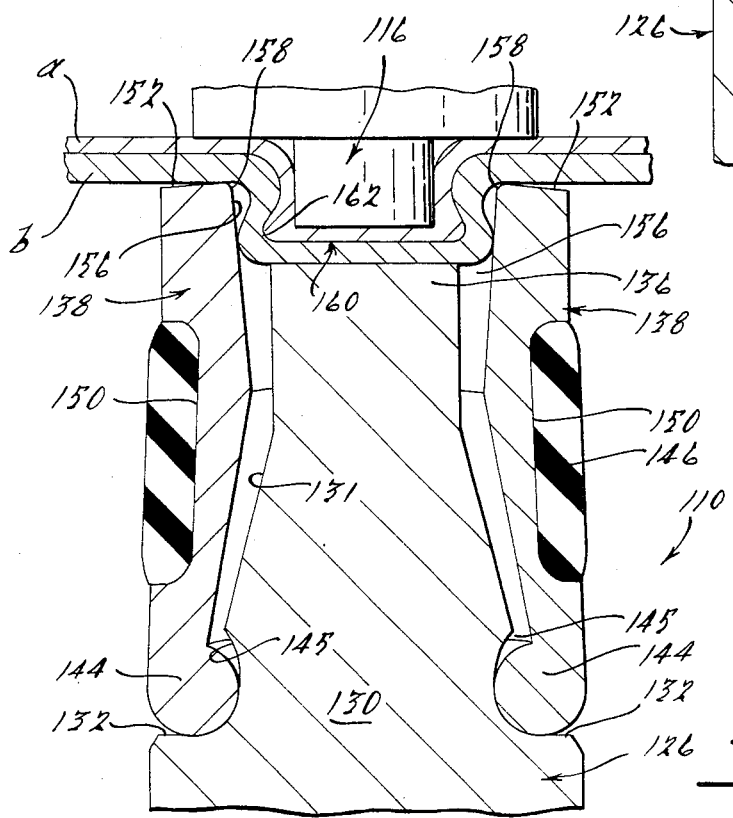
FIG. 17 is a partial sectional view of the apparatus of FIGS. 15 and 16, illustrating the apparatus substantially at the point of completion of a leakproof joint according to the present invention.

FIGS. 15 through 17 illustrate another embodiment of the apparatus for joining sheet material items to one another in a leakproof joint. In this embodiment, die assembly 110, which is adapted to cooperate with punch 116 to form the leakproof joint, includes die body 126 having an integral boss 130 and a circular annular shoulder 132 thereon. Integral boss 130 includes conical portion 131 interconnecting an anvil 136 with shoulder 132.

Two or more arcuate die segments 138 are disposed around boss 130 and include die segment shoulders 144, which are supported and engaged by shoulder 132 of die body 126. Boss 130 is provided with a circular annular relieved portion 145 adjacent the shoulder 132. This relieved portion 145 provides clearance so that the die segments 138 can primarily pivot outwardly about a lateral axis as the joint is being completed, in substantially the same manner as die portions 38 described above in connection with the embodiments of FIGS. 1 through 10.

Die portions 138 are maintained in their normally-closed position, shown in FIGS. 15 and 16, by means of a resilient, elastomeric band 146, which surrounds the lateral sides of die segments 138 in order to resiliently bias die segments 138 in a laterally inward direction toward the longitudinal axis of the die assembly. Resilient band 146 is received within, and longitudinally restrained by, a laterally inwardly recessed groove 150 extending circumferentially around the die segments 138. Although resilient band 146 can be composed of any of a wide variety of elastomeric materials suitable for particular applications of the present invention, it is preferred that resilient band 146 be composed of a urethane or urethane-containing material.

When die segments 138 are in their closed positions illustrated in FIGS. 15 and 16, the upper surfaces 152 lie in a common plane and the abutting faces of adjacent die segments lie in planes indicated by reference numeral 154. In the embodiment shown in FIGS. 15 and 16, die portions 138 are provided with circular inside faces recessed 156 that define a circular opening generally complementary with the lateral cross-sectional shape of punch 116. Die portions 138 are also provided with radiused edge portions 158, and are preferably uniformly spaced from punch 116, in order to substantially avoid shearing or tearing sheet material items a and b during the deformation of sheet material. Like the embodiments shown in FIGS. 1 through 10, the downward force exerted on die portions 138 by punch 116 will tend (at least initially) to close, rather than open, the die assembly 110. This is because the primarily pivotal and longitudinal supported engagement of die segment shoulders 144 with die body shoulder 132 is at a laterally-outward position relative to edge portions 158. Furthermore, shoulder 132 defines a solid surface easily capable of handling the axial loads on die segments 138 during operation of the apparatus.

In operation, die assembly 110 is similar in function to die assembly 10 of FIGS. 1 through 10 described above. However, the resilient band 146, with its inwardly-biasing and circumferentially continuous relationship with die segments 138, is believed to cause die segments 138 to be more uniformly inwardly-biased, thereby providing for a more uniform and controlled deformation of sheet material portions 160 into the circular opening formed by die segments 138. The resilient band in any of the embodiments of FIGS. 15 through 26 also offers the advantage of retaining the various die components in their proper positions and alignment, while providing for ease and convenience of disassembly. Furthermore, the respective clearances of the parts are based on the same criteria as used in the embodiments of FIGS. 1-10, so that sheet material portions 60 are drawn into the opening defined by recesses 156 in a non-fractured and non-sheared uniform configuration. As in the original embodiments, the action of punch 116 against anvil 136 causes lateral extrusion of the sheet material to form the leak-proof joint, in the manner illustrated in FIG. 17. The resilient band 146, in addition to contributing to a uniform and controlled formation of a joint, also provides substantial simplicity and economy in the manufacture, operation and maintenance of the die assembly.

Although the exemplary embodiment shown in FIGS. 15 through 17 illustrates the use of a circular punch 116, other shapes may be used, depending upon the particular application and the strength required. Examples of such shapes, and the modifications necessary to the apparatus in order to form such shapes, are shown in FIGS. 8 through 10 and are discussed above. Also, it should be noted that the number of die segments in any of the embodiments shown is for purposes of illustration only, and the various embodiments of the invention can have two die segments, or any other reasonable number of die segments.

FIGS. 18 through 19 illustrate modified versions of die assembly 110 cooperable with a punch for forming conventional "lanced" type joints, such as illustrated in FIGS. 13 and 14. Die assembly 210 of this embodiment of the invention differs from that of FIGS. 15 through 17 in that die portions 238 are not provided with semi-circular recesses 156 in order to define a circular opening for receiving a punch. Rather, die segments 238 are provided with substantially straight cutting edges 294 cooperable with a generally spade-shaped punch 216, which is substantially similar in shape to punch 16a shown in FIGS. 11 and 12. In virtually all respects, the embodiments of FIGS. 18 and 19 function in a manner similar to that of die assembly 10a shown in FIGS. 11 and 12, but is afforded the advantages in terms of uniformity of inward biasing, simplicity, and economy provided by a resilient, elastomeric band 246, which is substantially identical in composition and function to resilient band 146 shown in FIGS. 15 through 17.

FIG. 18A illustrates a variation of the die assembly 210 of FIGS. 18 and 19, wherein die assembly 210A includes the addition of non-shearing die segments 239A at each end of anvil 236A. Such end die segments 239A are preferably equipped with radiused corners 258A and are spaced from punch 216 a sufficient distance, so that shearing or tearing of the sheet material is substantially avoided at the end portions of the deformed sheet material portions. Thus, with such an embodiment, the end portions can be shaped and supported as desired or needed during forming of the lanced joint, while still restricting the shearing of the sheet material to the cutting edges 294 or 294A of the die assemblies 210 or 210A, respectively.

FIGS. 20 through 22 illustrate variations on still another embodiment of an apparatus for forming a leakproof sheet material joint, wherein die assembly 310 of FIGS. 20 and 21 includes die segments 338 defining a generally circular opening and being resiliently inwardly-biased by a resilient, elastomeric band 346. Unlike the somewhat similar embodiment of the invention shown in FIGS. 15 through 17, die body 326 does not include a relieved portion between its conical portion 331 of boss 330 and shoulder portion 332. Thus, the arcuately-shaped die segments 338 do not initially pivot (at least primarily) in an outward lateral direction, but rather are provided with planar end surfaces 334 so that they can primarily slide (at least initially) on shoulder 332 (which is widened in this embodiment) during operation of the die assembly 310. However, as in all the embodiments described herein, it is contemplated that all of the die segments will move (pivot and/or slide) to approximately the same degree, so that the joint will be as uniform as possible.

Die assembly 310 also differs from die assembly 110 (FIGS. 15 through 17) in that die segments 338 are provided with outside surfaces 350 which terminate at flanges 351 for locating and longitudinally restraining resilient, elastomeric band 346. Also, in order to substantially minimize possible damage to die segments 338 and to resilient band 346, such as would be caused by excessive laterally-outward movement of the die segments 338 or physical abuse, the die body 326 is equipped with a sleeve 370 threaded thereto. Sleeve 370 surrounds die segments 338 and resilient band 346, thereby protecting and limiting the laterally-outward movement thereof. It should also be noted that the sleeve 370 can also be advantageously employed to minimize the possibility of damage to the die segments and resilient biasing means in the various other embodiments of the present invention, whether adapted for forming leakproof joints or adapted for forming "lanced" joints, independently of whether such embodiments employ pivoting or sliding die segments.

FIG. 22 illustrates a variation of the embodiment of FIGS. 20 and 21. Die assembly 310A is substantially identical to die assembly 310 of FIGS. 20 and 21, with the exception of the eliminations of sleeve 370, which is replaced by a ring 372 laterally surrounding die segments 338 and preferably longitudinally captured between resilient band 346 and the flanges 351 of die segments 338. Limiting ring 372 functions generally in the same manner as sleeve 370, insofar as it limits lateral outward movement of the die segments in order to minimize possible damage to the die segments and the resilient band caused by excessive laterally outward, sliding or pivoting movement. Like sleeve 370, limiting ring 372 can also be so adapted for use in the other embodiments, although their shapes may have to be appropriately modified in applications where the joint is not circular, such by making them generally oval or rectangular in shape.

FIGS. 23 through 25 illustrate a die assembly 410, which is generally similar to the die assemblies 310 and 310A of FIGS. 20 through 22, in that die assembly 410 is provided with primarily slidable die segments 438 and 439. However, die assembly 410 is also somewhat similar to die assembly 210A of FIG. 18A, in that it is provided with a pair of straight-sided die segments 438 having shearing edges 494, as well as a pair of non-shearing die segments 439, in order to define a generally rectangular opening generally complementary in shape with at least a portion of the spade-shaped punch 416, and is thereby adapted to form the "lanced" joint in the manner described above. The die segments 438 and 439 are laterally surrounded and inwardly biased by a resilient, elastomeric band 446, which is similar to the resilient bands discussed above.

It should be noted that die assembly 410 is preferably equipped with non-shearing, end die segments 439 having radiused edges 458 thereon. In the exemplary embodiment of die assembly 410 shown in FIGS. 23 through 25, die segments 439 are arcuately-shaped and are preferably identical and interchangeable with the arcuate die segments 338 of the embodiments shown in FIGS. 20 through 22. Such interchangeability of die segments greatly contributes to the simplicity and economy of manufacture and operation of die assemblies according to the present invention.

FIG. 26 illustrates, in schematic or diagrammatic form, a very simple method for fabricating a number (in this case four) of die segments of the type described herein, substantially simultaneously. Four pieces of square bar stock 180 of suitable dimensions, and composed of a preselected material from which the die segments are to be formed, are bundled and chucked together with their sides in a mutually mating engagement, as shown in FIG. 26. They are then turned simultaneously to form the outside contour 186, such as by using a suitable cutting tool 184, and then bored simultaneously, in the usual manner, to form the inner peripheral shape 188 of the die segments 138 (for example). Alternatively, the pieces of bar stock 180 can be held rotationally stationary while suitable cutting tools move to perform the desired operations. Once the outer and inner shapes 184 and 186, respectively, are formed the pieces are unchucked to create the four exemplary die segments 138. Such a process substantially assures uniformity in the forming of the die segments, as well as greatly contributing to the ease, speed, and economy associated with the die fabricating process.

FIGS. 27 through 30 illustrate still other alternate embodiments of the present invention in which the embodiment of FIGS. 27 and 28 is somewhat similar to that of FIGS. 20 and 21. However, the resilient, elastomeric band 546 in integrally molded onto the die assembly 510, between the die segments 538 and the limiting sleeve 570, and compressibly expands during movement of the die segments 538, as shown in FIG. 28. In order to enhance the adhesion or retention of the elastomeric band 546 within the sleeve 570, a number of grooves 571 are preferably provided in the interior of the sleeve 570. Similarly, FIGS. 29 and 30 illustrate a variation on the embodiment of FIGS. 23 through 25, but wherein a resilient, elastomeric band 646 is integrally molded between the die segments 638 and 639 and the limiting sleeve 670, in a manner similar to that of the embodiment of FIGS. 27 and 28.

It should be noted that such a resilient, elastomeric band can be provided and integrally molded, as discussed above, onto at least any of the embodiments shown in FIGS. 15 through 30. The provision of such an integrally-molded band advantageously allows the die assembly to be provided as a unitized, one-piece assembly for installation on a joint-forming apparatus. Furthermore, this construction is also believed to allow the relieved portions, such as those indicated by reference numerals 145 and 245 shown in FIGS. 15 through 19, to be eliminated or at least substantially minimized.

The foregoing discloses and describes exemplary embodiments of the present invention. One skilled in the art will readily recognize from such discussion, and from the accompanying drawings, that various changes, modifications and variations may be made therein without departing from the spirit and scope of the invention as defined in the following claims.

What is claimed is

1. An apparatus for joining two or more sheet material items, the apparatus comprising:
    punch means;
    a die assembly including pair of die portions defining an opening of receiving said punch means to forcibly deform portions of the sheet material items when said punch means and said die portions are moved relatively toward one another in a generally longitudinal direction with said sheet material items disposed therebetween, said die portions being movable relative to one another in a generally lateral direction;
    means for longitudinally supporting said die portions during said deformation of said portions of the sheet material items;
    anvil means located in said opening, said die portions moving laterally away from one another in response to at least parts of said sheet material portions being deformed laterally outwardly by movement of said punch means against said anvil means; and
    elastic biasing means surrounding said die portions for resiliently biasing said die portions toward one another.

2. An apparatus according to claim 1, wherein said opening is complementary in shape to the cross-sectional shape of said punch means and providing a generally uniform clearance between said punch means and said die portions in order to prevent shearing of the sheet material items when the sheet material portions are forcibly deformed into said opening by the punch means.

3. An apparatus according to claim 2, wherein said die portions are provided with radiused edges around said opening.

4. An apparatus according to claim 1 wherein said opening is at least partially complementary in shape to the cross-sectional shape of said punch means, said die portions defining at least two sides of said opening substantially in alignment with corresponding sides of said punch means in order to cooperate with said punch means to shear the sheet material items at locations adjacent the sheet material portions when the sheet material portions are forcibly deformed into said opening.

5. An apparatus according to claim 1, wherein said elastic biasing means comprises a polymeric band generally surrounding said die portions.

6. An apparatus according to claim 1, wherein said die portions include a recessed peripheral portion for receiving and retaining said elastic biasing means.

7. An apparatus for joining two or more sheet material items, the apparatus comprising:
    punch means;
    a pair of die portions defining an opening for receiving said punch means to forcibly deform portions of the sheet material items when said punch means and said die portions are moved relatively toward one another in a generally longitudinal direction, said die portions being pivotally movable relative to one another in a generally lateral direction;
    means for longitudinally supporting said die portions during said deformation of said portions of the sheet material items;
    anvil means located in said opening, said die portions moving laterally away from one another in response to at least parts of said sheet material portions being deformed laterally outwardly by movement of said punch means against said anvil means; and
    elastic biasing means surrounding said die portions for resiliently biasing said die portions in a generally lateral direction toward one another.

8. An apparatus according to claim 7, wherein said die portions include generally laterally inwardly recessed peripheral portions extending therearound and generally laterally-extending flange portions longitudinally adjacent said recessed peripheral portions, said elastic biasing means including an elastomeric band received in said recessed peripheral portions and retained therein at least in part by said flange portions.

9. An apparatus according to claim 7, further including a limiting ring generally surrounding said die portions for limiting the laterally outward pivotal movement of said die portions, thereby substantially minimizing damage to said die portions and to said elastic biasing means caused by excessive laterally outward pivotal movement of said die portions.

10. An apparatus according to claim 7, further including a limiting sleeve generally surrounding said die portions and being normally laterally outwardly spaced therefrom for limiting the laterally outward pivotal movement of said die portions, thereby substantially minimizing damage to said die portions and to said elastic biasing means caused by excessive laterally outward pivotal movement of said die portions.

11. An apparatus for joining two or more sheet material items, the apparatus comprising:
    punch means;
    a pair of die portions defining an opening for receiving said punch means to forcibly deform portions of the sheet material items when said punch means and said die portions are moved relatively toward one another in a generally longitudinal direction, said die portions being slidably movable relative to one another in a generally lateral direction;
    means for longitudinally supporting said die portions during said deformation of said portions of the sheet material items;
    anvil means located in said opening, said die portions moving laterally away from one another in response to at least parts of said sheet material portions being deformed laterally outwardly by movement of said punch means against said anvil means; and
    elastic biasing means surrounding said die portions for resiliently biasing said die portions in a generally lateral direction toward one another.

12. An apparatus according to claim 11, wherein said die portions include generally laterally inwardly recessed peripheral portions extending therearound and generally laterally-extending flange portions longitudinally adjacent said recessed peripheral portions, said elastic biasing means being received in said recessed peripheral portions and retained therein at least in part by said flange portions.

13. An apparatus according to claim 11, further including a limiting ring generally surrounding said die portions for limiting the laterally outward slidable movement of said die portions, thereby substantially minimizing damage to said die portions and to said elastic biasing means caused by excessive laterally outward slidable movement of said die portions.

14. An apparatus according to claim 11, further including a limiting sleeve generally surrounding said die portion and being normally laterally outwardly spaced therefrom for limiting the laterally outward slidable movement of said die portions, thereby substantially minimizing damage to said die portions and to said elastic biasing means caused by excessive laterally outward slidable movement of said die portions.

15. An apparatus for joining two or more sheet material items, the apparatus comprising:
   punch means;
   a pair of die portions configured to cooperate with the punch means to forcibly deform portions of the sheet material items when said punch means and said die portions are moved relatively toward one another in a generally longitudinal direction, said die portions being movable relative to one another in a generally lateral direction, said die portions defining a generally circular opening therebetween for receiving said sheet material portions when said sheet material portions are forcibly deformed into said opening by said punch means, said opening being complementary in shape to the cross-sectional shape of said punch means and providing a generally uniform clearance between said punch means and said die portions in order to prevent shearing of the sheet material items when said sheet material portions are forcibly deformed into said opening by said punch means;
   means for longitudinally supporting said die portions during said deformation of said portions of the sheet material items;
   anvil means located in said opening, said die portions moving laterally away from one another in response to at least parts of said sheet material portions being deformed laterally outwardly by movement of said punch means against said anvil means; and
   elastic biasing means surrounding said die portions for resiliently biasing said die portions in a generally lateral direction toward one another.

16. An apparatus according to claim 15, comprising three of said die segments defining said circular opening.

17. An apparatus according to claim 15, comprising four of said die segments defining said circular opening.

18. An apparatus for joining two or more sheet material items, the apparatus including longitudinal movable punch means, the apparatus further comprising:
   spaced die portions configured to cooperate with the punch means to forcibly deform portions of the sheet material items when the punch means and said die portions are moved relatively toward one another in a generally longitudinal direction, said die portions being movable relative to one another in a generally lateral direction, said die portions including a number of die segments defining a non-circular opening therebetween for receiving the sheet material portions when the sheet material portions are forcibly deformed into said opening by the punch means, said opening being at least partially complementary to the cross-sectional shape of the punch means, said die segments defining at least two sides of said opening substantially in alignment with corresponding sides of the punch means in order to cooperate with the punch means to shear the sheet material items at locations adjacent the sheet material portions when the sheet material portions are forcibly deformed into said opening;
   means for longitudinally supporting said die portions during said deformation of said portions of the sheet material items;
   anvil means located in said opening, said die portions moving laterally away from one another in response to at least parts of said sheet material portions being deformed laterally outwardly by movement of said punch means against said anvil means; and
   elastic biasing means surrounding said die portions for resiliently biasing said die portions in a generally lateral direction toward one another.

19. An apparatus according to claim 18, wherein a first pair of said die segments are pivotally movable relative to one another in said generally lateral direction, a second pair of said die segments providing clearance between the punch means and said second pair of die segments in order to prevent shearing of the sheet material items at locations corresponding to said second pair of die segments when the sheet material portions are forcibly deformed into said opening by the punch means.

20. An apparatus according to claim 19, wherein said first pair of said die segments have sides that are generally straight and generally parallel to one another, said second pair of die segments having generally arcuate sides defining a part of said opening.

21. An apparatus according to claim 19, wherein said first pair of said die segments have sides that are generally straight and generally parallel to one another, said second pair of die segments having generally straight sides defining a part of said opening.

22. An apparatus according to claim 19, wherein said second pair of die segments are also laterally pivotal relative to one another in a generally lateral direction.

23. An apparatus according to claim 18, wherein a first pair of said die segments are slidably movable relative to one another in said generally lateral direction, a second pair of said die segments providing clearance between the punch means and said second pair of die segments in order to prevent shearing of the sheet material items at locations corresponding to said second pair of die segments when the sheet material portions are forcibly deformed into said opening by the punch means.

24. An apparatus according to claim 23, wherein said first pair of said die segments have sides that are generally straight and generally parallel to one another, said second pair of die segments having generally arcuate sides defining a part of said opening.

25. An apparatus according to claim 23, wherein said first pair of said die segments have sides that are generally straight and generally parallel to one another, said second pair of die segments having generally straight sides defining a part of said opening.

26. An apparatus according to claim 23, wherein said second pair of die segments are also laterally slidable relative to one another in a generally lateral direction.

27. An apparatus for joining two or more sheet material items, the apparatus comprising:
   punch means;

a pair of die portions defining an opening for receiving said punch means to forcibly deform portions of the sheet material items when said punch means and said die portions are moved relatively toward one another in a generally longitudinal direction with said sheet material items disposed therebetween, said die portions being movable relative to one another in a generally lateral direction;

means for longitudinally supporting said die portions during said deformation of said portions of the sheet material items;

anvil means located in said opening, said die portions moving laterally away from one another in response to at least parts of said sheet material portions being deformed laterally outwardly by movement of said punch means against said anvil means; and elastic biasing means surrounding said die portions and molded thereon for resiliently biasing said die portions in a generally lateral direction toward one another.

28. An apparatus according to claim 27, further including a limiting ring generally surrounding said die portions for limiting the laterally outward movement of said die portions, thereby substantially minimizing damage to said die portions and to said elastic biasing means caused by excessive laterally outward movement of said die portions.

29. An apparatus according to claim 27, further including a limiting sleeve generally surrounding said die portions and being normally laterally outwardly spaced therefrom for limiting the laterally outward movement of said die portions, thereby substantially minimizing damage to said die portions and to said elastic biasing means caused by excessive laterally outward movement of said die portions.

30. An apparatus for joining two or more sheet material items, the apparatus comprising:

punch means;

a pair of die portions defining an opening for receiving said punch means and configured to cooperate with said punch means to forcibly deform portions of the sheet material items when said punch means and said die portions are moved relatively toward one another in a generally longitudinal direction with said sheet material items disposed therebetween, said die portions being movable relative to one another in a generally lateral direction;

means for longitudinally supporting said die portions during said deformation of said portions of the sheet material items; and anvil means located in said opening, said die portions moving laterally away from one another in response to at least parts of said sheet material portions being deformed laterally outwardly by movement of said punch means against said anvil means, the lateral dimension of said punch means being approximately twice the combined, undeformed thicknesses of said sheet material items, and the lateral dimension of the spacing between said die portions being approximately equal to the sum of the lateral dimension of said punch means plus approximately 80 percent of the combined, undeformed thicknesses of the sheet material items.

* * * * *

UNITED STATES PATENT AND TRADEMARK OFFICE
CERTIFICATE OF CORRECTION

PATENT NO. : 4,757,609

DATED : July 19, 1988

INVENTOR(S) : Edwin G. Sawdon

It is certified that error appears in the above-identified patent and that said Letters Patent is hereby corrected as shown below:

In the references cited: Add -- 4,569,111 dated 2/11/86 to Mutou --.

Column 2, line 57, "incorporting" should be -- incorporating --.

Column 5, line 22, "recessed" should be -- recesses --.

Column 5, line 34, after "M2)" insert -- ) --.

Column 7, line 48, "recessed" should be -- recesses --.

Column 10, line 42, "in" should be -- is --.

Column 11, line 10, Claim 1, "of" should be -- for --.

Signed and Sealed this

Ninth Day of July, 1991

Attest:

HARRY F. MANBECK, JR.

Attesting Officer    Commissioner of Patents and Trademarks